United States Patent [19]
Aramaki et al.

[11] Patent Number: 5,453,967
[45] Date of Patent: Sep. 26, 1995

[54] DISC REPRODUCING APPARATUS WHICH STOPS RECORDING IN RESPONSE TO COMPRESSED DATA STORED, IN A RECORD STOP STATE, IN A MEMORY

[75] Inventors: Junichi Aramaki; Teepei Yokota, both of Chiba; Nobuyuki Kihara, Tokyo, all of Japan

[73] Assignee: Sony Corporation, Japan

[21] Appl. No.: 357,976

[22] Filed: Dec. 16, 1994

Related U.S. Application Data

[63] Continuation of Ser. No. 64,768, May 19, 1993, abandoned.

[30] Foreign Application Priority Data

May 22, 1992 [JP] Japan .................................. 4-155723

[51] Int. Cl.$^6$ ........................................................ G11B 7/00
[52] U.S. Cl. ........................ 369/59; 369/58; 369/48; 369/60; 369/54
[58] Field of Search .................. 369/58, 59, 60, 369/54, 48, 49, 43, 32, 124, 13, 47

[56] References Cited

U.S. PATENT DOCUMENTS

| 5,212,678 | 5/1993 | Roth et al. | 369/43 |
| 5,243,588 | 9/1993 | Maeda et al. | 369/60 |

*Primary Examiner*—Scott J. Sugarman
*Assistant Examiner*—Muhammad N. Edun
*Attorney, Agent, or Firm*—Limbach & Limbach; Alan S. Hodes

[57] ABSTRACT

A disc recording apparatus includes a first encoder, a memory, a second encoder, a head apparatus and a controller. The first encoder compresses an input signal. The memory once stores the compressed data compressed by the first encoder. The second encoder encodes the read out data from the memory in a predetermined unit. The head apparatus is supplied with the recording data from the second encoder and records the recording data on the disc. The controller controls the memory and the head apparatus so that when data is left in the memory in the record stop state, the record operation by the head apparatus is intermitted after the data in the memory is read out and entirely recorded on the disc.

11 Claims, 7 Drawing Sheets

5,453,967

DISC REPRODUCING APPARATUS WHICH STOPS RECORDING IN RESPONSE TO COMPRESSED DATA STORED, IN A RECORD STOP STATE, IN A MEMORY

This is a continuation of application Ser. No. 08/064,768 filed on May 19, 1993 now abandoned.

BACKGROUND OF THE INVENTION

1. Field of the Invention

The present invention relates to a disc recording apparatus. More particularly, the present invention relates to a disc recording apparatus for recording data on a disc after it has been temporarily stored in a memory.

2. Description of the Prior Art

An optical disc system which records and/or reproduces digital audio signals to and from an optical disc or a magneto-optical disc with a diameter of 64 mm which is housed in a disc cartridge has been developed. With sound compression technologies, the amount of original digital audio signals is compressed to around ⅕ times thereof and recorded on the optical disc. Thus, using a small disc with a diameter of 64 mm, digital audio signals can be recorded or reproduced thereto and therefrom for around 74 minutes long.

In an optical disc recording and/or reproducing apparatus, when data is recorded, laser power should be controlled. In addition, the interleave length of CIRC (cross-interleave Reed-Solomon code) is 108 frames, which is longer than one sector. Thus, a linking area is required. Therefore, on the optical disc, signals are recorded or reproduced cluster by cluster, each cluster consisting of 36 sectors. Data is recorded to 32 sectors of one cluster consisting of 36 sectors. The remaining four sectors are used for a linking area and a subdata area.

At the time of reproducing, data is reproduced from the optical disc at a higher transmission rate than that of a decoder which decodes compressed data. The reproduction data is temporarily stored in a buffer memory. Even if digital signals stored on the optical disc cannot be read due to vibration or the like, the data stored in the buffer memory is output as reproduction signals for around 3 seconds. During this time, an optical pickup is accessed again to the position at which the track jump has occurred and the signals are read again. Thus, it can be prevented that reproduction sounds are intermitted.

In such an optical disc, after data of one cluster is stored in a buffer memory, the data is recorded on the optical disc. To fully collect data of one cluster, it takes around 2 seconds. When a stop key is pressed while data is being recorded, if the record operation is stopped after data of one cluster is fully collected in the buffer memory, the record state continues until the data is fully collected in the buffer memory although the user has stopped recording. Thus, the operability of the optical disc is improper.

On the other hand, when the stop key is pressed while data is being recorded, if the record operation is stopped while data of one cluster is stored in the buffer memory, the data stored in the buffer memory is lost. As a result, there occurs a problem such that when data is read from the optical disc, the last portion thereof is discontinued.

OBJECTS AND SUMMARY OF THE INVENTION

It is, therefore, an object of the present invention to provide a disc recording apparatus which resolves the above-mentioned problems.

It is another object of the present invention to provide a disc recording apparatus in which a predetermined data is added to data stored in a memory in the record stop state to form data of one cluster and the data is recorded on a disc.

According to an aspect of the present invention, there is provided a disc recording apparatus comprising: a first encoder; a memory; a second encoder; a head apparatus; and a controller. The first encoder compresses an input signal. The memory once stores the compressed data compressed by the first encoder. The second encoder encodes the read out data from the memory in a predetermined unit. The head apparatus is supplied with the recording data from the second encoder and records the recording data on the disc. The controller controls the memory and the head apparatus so that when data is left in the memory in the record stop state, the record operation by the head apparatus is intermitted after the data in the memory is read out and entirely recorded on the disc.

According to the present invention, it can be prevented that even if the record operation is intermitted at the time of recording data on a disc, the data in the memory is not recorded.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
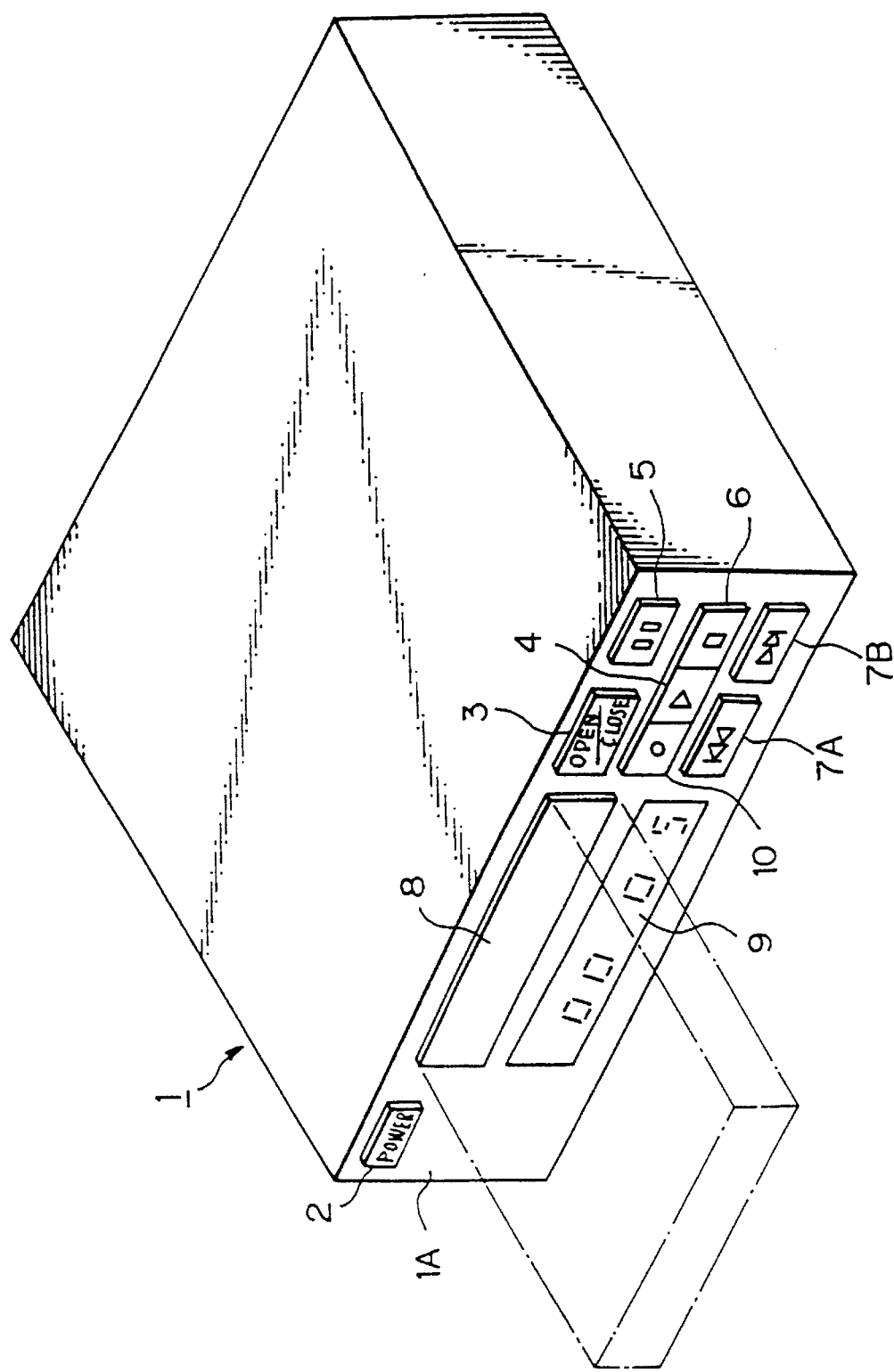
FIG. 1 is a perspective view showing an external overall construction of an embodiment according to the present invention.

An embodiment of the present invention will now be described hereunder with reference to the accompanying drawings. FIG. 1 is a perspective view showing an external overall construction of an optical recording and/or reproducing apparatus to which the present invention has been applied. In FIG. 1, on a front panel 1A of the optical disc recording and/or reproducing apparatus 1, a display 9 is disposed. In addition, on the front panel 1A of the optical disc recording and/or reproducing apparatus 1, a power key 2, an OPEN/CLOSE key 3, a reproduction key 4, a pause key 5, a stop key 6, AMS keys 7A and 7B, and a record key 10 are disposed. Reference numeral 8 denotes a disc tray which is pulled from an opening of the front panel 1A.

When the OPEN/CLOSE key 3 is operated, the disc tray 8 is pulled out from the apparatus 1 as shown by alternate long and short dash lines of the figure. On the disc tray 8, an optical disc (not shown in the figure) is mounted. When the OPEN/CLOSE key 3 is operated again, the tray 8 is pulled into the apparatus 1. The optical disc is loaded in a recording and/or reproducing portion within the apparatus 1.

On the display 9, time information such as the total play time of the optical disc being loaded, the elapsed time of a music program being reproduced, the remaining play time of the music program being reproduced, the remaining play time of the remaining music programs and the track number of the music program being reproduced are displayed. In addition, for a disc on which a disc name and a track name have been recorded, they are displayed on the display 9.

Figure 2:
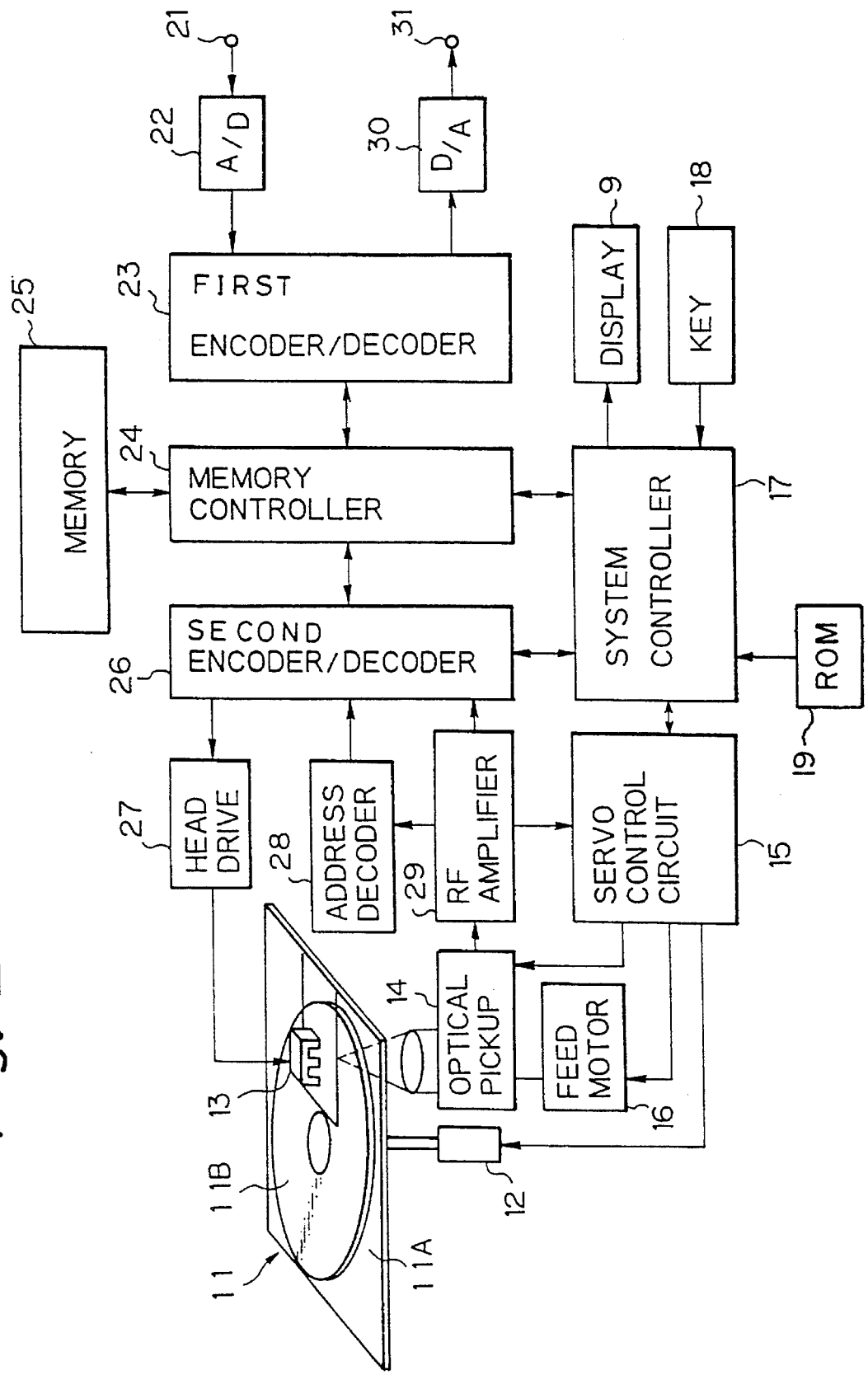
FIG. 2 is a block diagram showing the construction of the embodiment according to the present invention.

FIG. 2 is a block diagram showing the construction of an optical disc recording and/or reproducing apparatus to which the present invention has been applied. Reference numeral 11 indicates a disc cartridge. In a cartridge 11A, an optical disc 11B with a diameter of 64 mm is housed. There are three types of optical discs: reproduction-only optical discs, a recordable magnetooptical disc, and an optical disc which have both a reproduction-only region and a recordable region. In this example, it is assumed that a magnetooptical disc is housed in the disc cartridge 11.

On the optical disc 11B, a pregroove which is wobbled in the radial direction of the disc are formed according to address data. Data is recorded on or read from the optical disc 11B according to address data which is obtained by detecting the pregroove. As will be described in detail later, a record region of the optical disc 11B comprises a first record region in which data according to information such as conventional music signals are recorded and a second record region in which catalog information such as so-called TOC (Table Of Contents) is recorded. Record data according to a plurality of programs and a plurality of music programs are recorded on the optical disc 11B along the pregroove.

Reference numeral 12 denotes a spindle motor which rotates the optical disc 11B at a constant linear velocity. The spindle motor 12 is controlled by a servo control circuit 15 which will be described later. Reference numeral 13 indicates a magnetic head which generates an external magnetic field. The magnetic head 13 applies a vertical magnetic field which is modulated according to data to be recorded on the optical disc 11B. Reference numeral 14 denotes an optical pickup which irradiates a light beam onto the optical disc 11B. The magnetic head 13 and the optical pickup 14 are oppositely disposed through the optical disc 11B. The magnetic head 13 and the optical pickup 14 are connected with a connection mechanism (not shown in the figure). Thus, the magnetic head 13 and the optical pickup 14 are integrally traveled in the radial direction of the optical disc 11B. Reference numeral 15 indicates a servo control circuit. The servo control circuit 15 generates error signals such as a focusing error signal and a tracking error signal according to output signals of the optical pickup 14 obtained through an RF amplifier 29 which will be described later. The servo control circuit 15 supplies control signals for performing focusing servo control and tracking servo control to the optical pickup 14 based on the generated error signals.

Reference numeral 16 denotes a feed motor which travels the optical pickup 14 in the radial direction of the optical disc 11B. The feed motor 16 travels the optical pickup 14 according to a feed signal received from the servo control circuit 15 so as to allow the optical pickup 14 to perform a track jump operation. In addition, the feed motor 16 receives a low frequency component of the tracking error signal supplied from the servo control circuit 15. When the optical pickup 14 is traveled in the radial direction of the optical disc 11B by the feed motor 16, the magnetic head 13 is also traveled in the radial direction of the optical disc 11B.

Reference numeral 17 shows a system controller which controls the operation of each constructional portion. The system controller 17 is connected to a display 9 and an input key 18. The input key 18 accords with the power key 2, the OPEN/CLOSE 3, the play key 4, the pause key 5, the stop key 6, the music program selection keys 7A and 7B, and the record key 10 which are disposed on the front panel 1A shown in FIG. 1. On the display 9, there is displayed the catalog information of the optical disc 11B, for example, time information such as total play time, play time of a music program or a program which is being played, remaining time, track number, disc name, and track name of a music program or a program being played.

Reference numeral 19 is a memory which comprises an ROM (Read Only Memory). As will be described later, the memory 19 stores time information according to the cluster and sector number. The ROM 19 is connected to the system controller 17. The time information stored in the ROM 19 is read out with data according to the cluster and sector number (namely, address data) obtained by the system controller 17.

Reference numeral 21 denotes an input terminal. Reference numeral 22 indicates an A/D converter which converts an analog audio signal received from the input terminal 21 into a 16-bit digital signal. The sampling frequency of the A/D converter 22 is 44.1 kHz. Reference numeral 23 shows a first encoder/decoder. The first encoder/decoder 23 compresses the amount of the digital signal supplied from the A/D converter 22 to around 1/5 times thereof. The first encoder/decoder 23 compresses and expands the signal with modified DCT (Discrete Cosine Transform) technique. Reference numeral 24 denotes a memory controller which controls data write operation to a memory 25 and data read operation therefrom. The memory controller 24 includes a data generating circuit for generating dummy data as will be described later. The memory 25 is, for example, a dynamic RAM with a storage capacity of 1 Mbits. The memory 25 temporarily stores data received from the first encoder/decoder 23 through the memory controller 24 when data is recorded on the optical disc 11B. When data is reproduced from the optical disc 11B, data received from a second encoder/decoder 26 is temporarily stored in the memory 25 through the memory controller 24. The second encoder/decoder 26 performs an error correction process for the data being read from the memory 25. In addition, the second encoder/decoder 26 performs an EFM (eight-to-fourteen modulation) operation for data. CIRC is used as an error correction code.

Reference numeral 27 indicates a drive circuit for the magnetic head 13. The drive circuit 27 receives record data from the second encoder/decoder 26. Reference numeral 28 denotes an address decoder which decodes an address signal which has been recorded as a wobbled groove according to a reproduction signal supplied from an RF amplifier 29. Reference numeral 30 indicates a D/A converter which converts a digital signal expanded by the first encoder/decoder 23 into an analog audio signal. The analog audio signal is output from an output terminal 31.

To record data on the optical disc 11B, the optical pickup 14 irradiates a light beam in record level onto the optical disc 11B so as to heat a record layer thereof which is a magneto-optical record layer in this example. At this point, a vertical magnetic field according to the record data is applied from the opposite surface of the optical disc 11B. The magnetooptical record layer, serving as the record layer, is magnetized in the direction of the vertical magnetic field when the temperature lowers after the optical beam moves on. As a result, data is recorded on the optical disc 11B. In order to read data from the optical disc 11B, a light beam having a power lower than that at the time of recording is irradiated on the optical disc 11B. The light beam is reflected by the magnetooptical record layer which serves as the optical record layer of the optical disc 11B. The reflected light beam is detected by a pair of photodetectors of the optical pickup 14. A reproduction signal of the optical disc 11B can be obtained by obtaining the difference between output signals from the pair of photodetectors.

When the first encoder/decoder 23 receives data at a transmission rate of 300 kbits/sec, it can decompress the input signal and reproduce a continuous sound. On the other hand, as described above, the optical pickup 14 reads a digital signal from the optical disc 11B at a transmission rate of 1.4 Mbits/sec. When the memory 25 has a storage capacity of 1 Mbits, it becomes full in around 0.9 seconds. Even if a digital signal cannot be read from the optical disc 11B due to vibration or the like, the data stored in the memory 25 can be continuously output. During this time, the optical pickup 14 can be traveled to the position where relevant data could not be read so as to access that data. Thus, so-called "sound jump" can be prevented.

Figure 3:
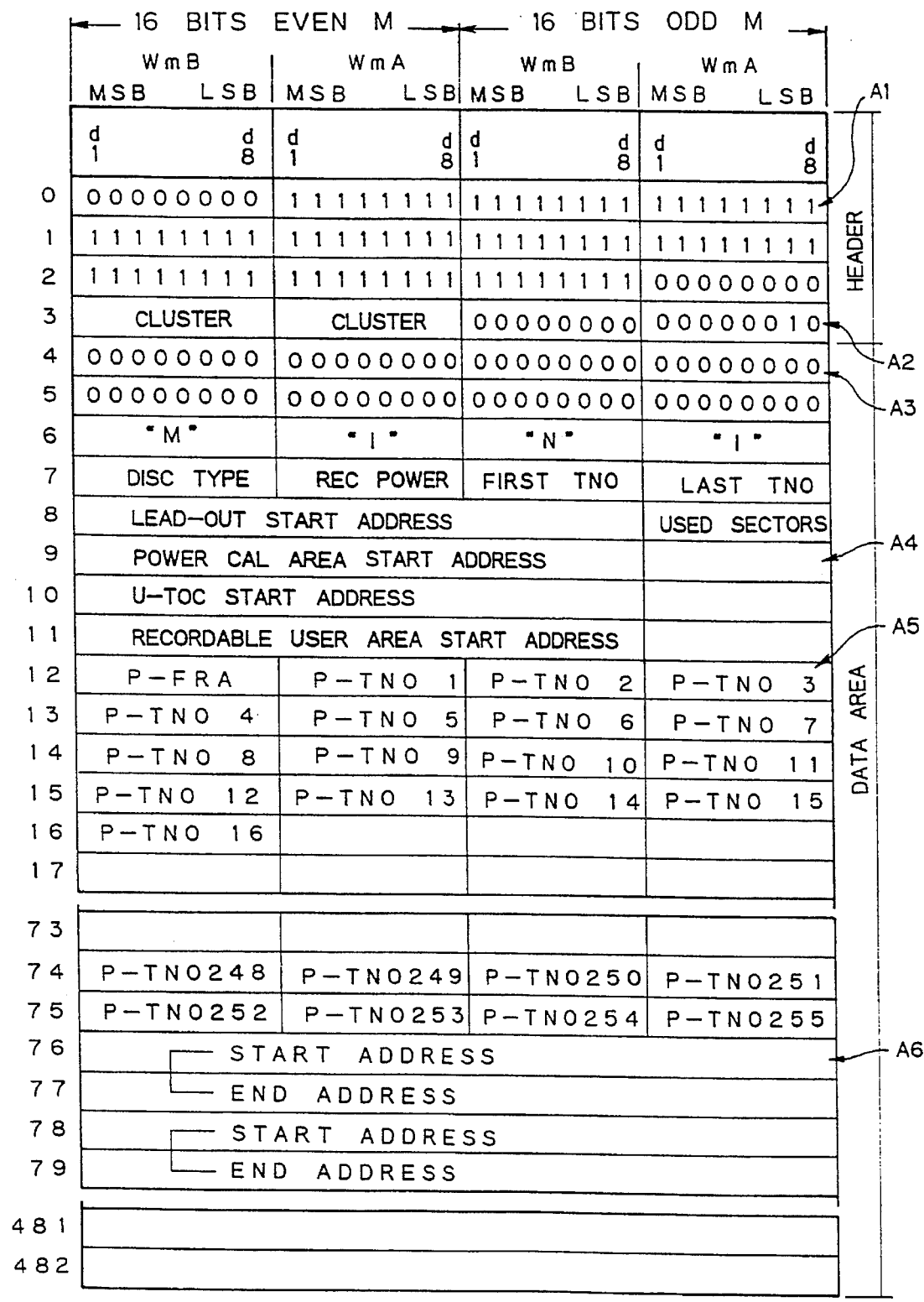
FIG. 3 is a schematic diagram for explaining a TOC for use with the embodiment according to the present invention.

On the innermost periphery of the disc 11B of the optical disc 11B, a TOC (Table Of Contents) is disposed. On the TOC, information of data recorded on the optical disc 11B is recorded. FIG. 3 shows the construction of the TOC. The TOC consists of a header area and a data area. The header area starts with a fixed sync pattern area A1. The sync pattern area A1 is followed by a header information area A2 which represents a cluster and a sector.

The data area starts with a fixed pattern area A3. The pattern area A3 is followed by an identification information area A4 which contains a mini disc identifier, a disc type identifier (reproduction only type, recordable type, or hybrid type having dedicated reproduction area and recordable area), a record power, a start track number, a last track number, a lead-out start address, a use sector, a power calibration start address, a user TOC start address, and a recordable user area start address. The identification information area A4 is followed by a track number point area A5 which contains P-TNO1, P-TNO2, P-TNO3, . . . , etc. The track number points (P-TNO1, P-TNO2, P-TON3, . . . , etc.) are pointers which represent addresses of information of the start address and end address of each track number. The track number point area A5 is followed by a track information area A6. The information area A6 contains the start address and end address of each track. The start address and end address of each track are designated by track number points (P-TNO1, P-TNO2, P-TNO3, . . . , etc.).

Figure 4:
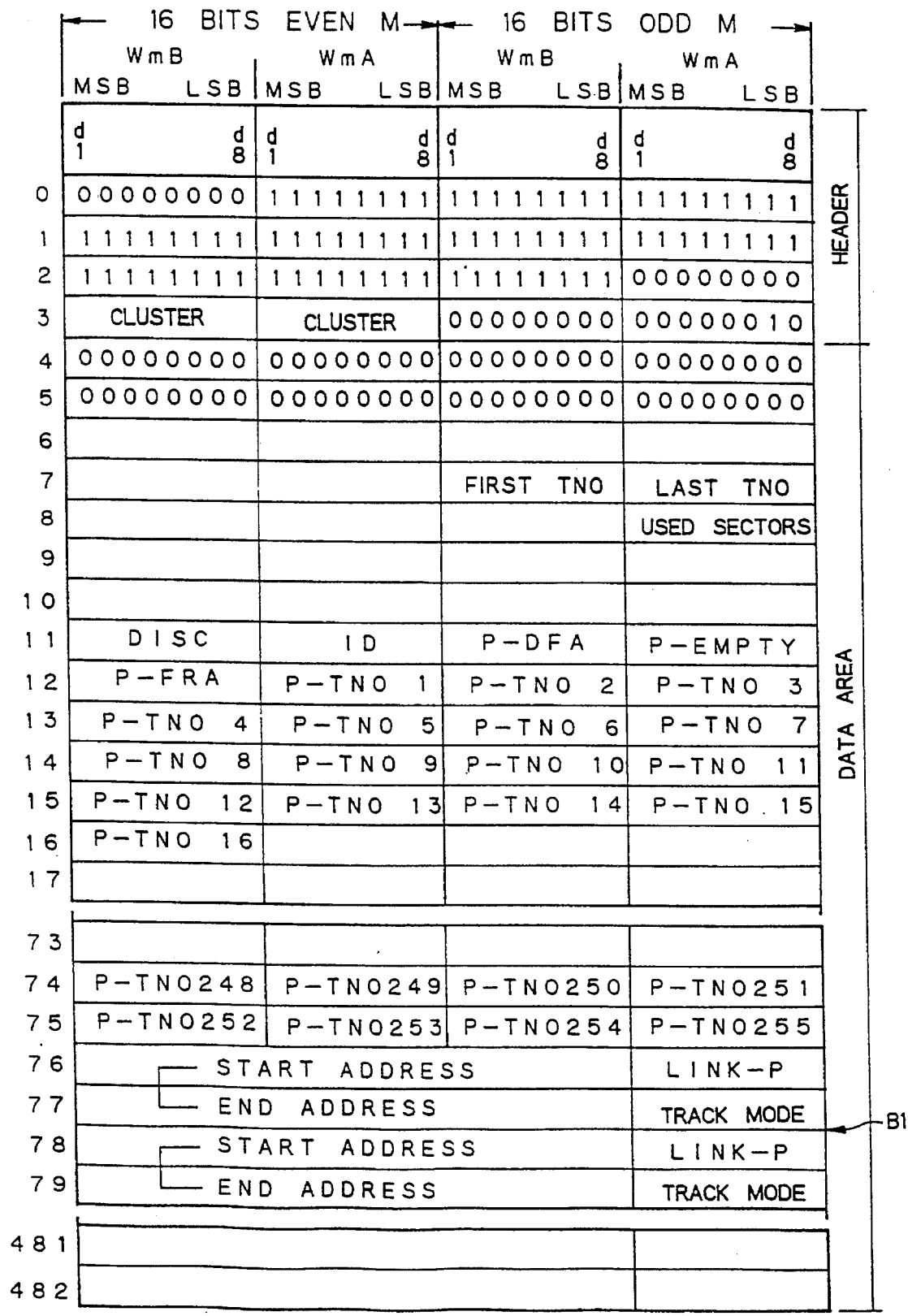
FIG. 4 is a schematic diagram for explaining a TOC for use with the embodiment according to the present invention.

In addition, to manage an audio signal being recorded, the optical disc 11B is provided with a user TOC. FIG. 4 shows the construction of the user TOC. The basic construction of the user TOC is the same as that of the above-mentioned TOC. The user TOC contains information named Link-P (denoted by B1) as track information. The Link-P represents a track which is preceded by a relevant track. Thus, to change the sequence of programs or music programs, it is not necessary to change the sequence of tracks. In other words, all track information can be managed on the user TOC.

When a disc is loaded, the information of both the TOCs is first accessed to be read from the optical disc 11B and stored in part of the memory 25. If there is a record operation for the optical disc 11B, the user TOC is updated according to the data which has been recorded in the memory 25. When the disc cartridge 11 is ejected, the updated user TOC is recorded in the lead-in area on the optical disc 11B. Thereafter, the disc cartridge 11 is ejected from the recording and/or reproducing apparatus 1.

The basic record operation of the optical disc recording and/or reproducing apparatus constructed above will now be described.

An analog audio signal inputted from the input terminal 21 is converted into a 16-bit digital signal by the A/D converter 22. The digital signal which has been converted by the A/D converter 22 is supplied to the first encoder/decoder 23. At the first encoder/decoder 23, the amount of input digital signal is compressed to around 1/5 times thereof, for example, a 16-bit digital signal down to a 4-bit digital signal. The compressed digital data is once stored in the memory 25 sector by sector through the memory controller 24. The data stored in the memory 25 is read cluster by cluster and supplied to the second encoder/decoder 26 through the memory controller 24. An EFM (Eight to Fourteen Modulation) operation and the addition of error correction code are performed on digital data supplied to the second encoder/decoder 2 26 by the memory controller 24. Record data out from the second encoder/decoder 26 is supplied to the magnetic head 13 through the drive circuit 27. A vertical magnetic field modulated according to the record data is applied to the optical disc 11B by the magnetic head 13. At this point, a light beam in record power level is irradiated to the optical disc 11B from the disc substrate side by the optical pickup 14. If a track jump has occurred at this time, the system controller 17 performs the following control operation. First, the power of the light beam which is irradiated to the optical disc 11B from the optical pickup 14 is lowered to the reproduction level. Then driving of the magnetic head 13 is stopped. At the same time, reading of data from the memory 25 is stopped while writing of data into the memory 25 is continued. The optical pickup 14 is traveled back to the position on the optical disc 11B where the track jump has occurred. The power of the light beam which is irradiated to the optical disc 11B from the optical pickup 14 is increased again to the record level. At the same time, reading of data stored in the memory 25 is started again and the record operation is started again. Detection whether or not the track jump has occurred is performed, for example, by watching the system controller 17 to see whether or not the address information of the optical disc 11B which has been decoded by the address decoder 28 is discontinued.

A reading operation of the data recorded on the optical disc 11B is performed as follows. A desired program number or music program number is input by the input key 18. The input data is supplied to the system controller 17. When the optical disc 11B is loaded into the disc recording and/or reproducing apparatus 1, the system controller 17 travels the optical pickup 14 in the radial direction of the optical disc 11B by driving the feed motor 16 according to the TOC information stored in part of the memory 25. When the optical pickup 14 reaches the position on the optical disc 11B where the designated program or music program is recorded, reading of the optical disc 11B by the optical pickup 14 is started. Reproduction data from the optical pickup 14 is supplied to the servo control circuit 15, the second encoder/decoder 26 and the address decoder 28 through the RF amplifier 29. At the address decoder 28, the address information which has been recorded beforehand on the optical disc 11B is extracted from the reproduction data and supplied to the system controller 17 through the second encoder/decoder 26. At the servo control circuit 15, servo signals such as a focusing servo signal and a tracking servo signal are generated and supplied to the optical pickup 14 and the spindle motor 12. At the second encoder/decoder 26 a decoding process such as an EFM demodulation and an error correction is performed for the reproduction data. The digital data from the second encoder/decoder 26 is temporarily stored in the memory 25 through the memory controller 24.

Data is read from the memory 25 cluster by cluster and supplied to the first encoder/decoder 23. At the first encoder/decoder 23 an expanding process for the data read from the memory 25 is performed. The digital signal output from the first encoder/decoder 23 is supplied to the D/A converter 30. At the D/A converter 30, the digital signal is converted into an analog audio signal. The analog audio signal is output from the output terminal 31.

When a track jump has occurred during the reproduction operation, basically the same operation as that at the time of recording is performed. When it is detected that the track jump has occurred, writing of data into the memory 25 is stopped and the optical pickup 14 is traveled to the position where the track jump has occurred. During this time, reading of data from the memory 25 is continued. When the optical pickup 14 is traveled back to the position where the track jump has occurred, reading of the optical disc 11B is started again. At the same time, writing of data into the memory 25 is started again.

Next, in the embodiment according to the present invention, the case where the stop key 6 is operated in the record operation mode, namely, the record operation where the record stop is being performed will be described with reference to FIGS. 5 to 8.

While the disc recording and/or reproducing apparatus is in record operation mode, if the stop key 6 is operated, in most cases data is being stored in the memory 25. Generally, data of less than one cluster is being stored in the memory 25. A data generator provided in the memory controller 24 generates dummy data such as null data. The dummy data is written to the memory 25. The dummy data is generated so that the total of the data stored in the memory 25 and the dummy data becomes one cluster. Input signals to the A/D converter 22 and the memory controller 23 are stopped according to an output from the system controller 17. Data to which the dummy data has been added and which is stored in the memory 25 is read from the memory 25 and recorded on the optical disc 11B.

Figure 5A:
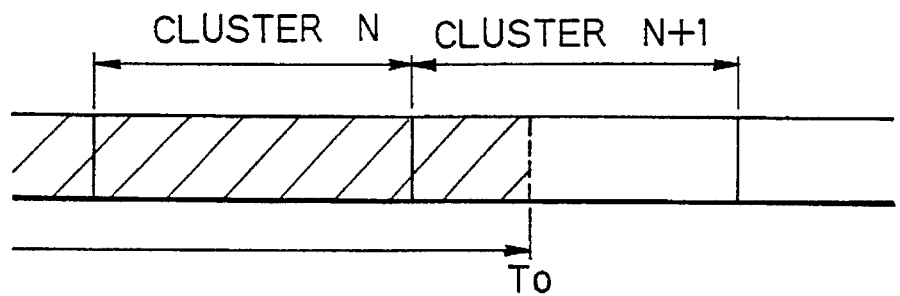
FIGS. 5A and 5B are schematic diagrams for explaining the embodiment according to the present invention.
Figure 5B:
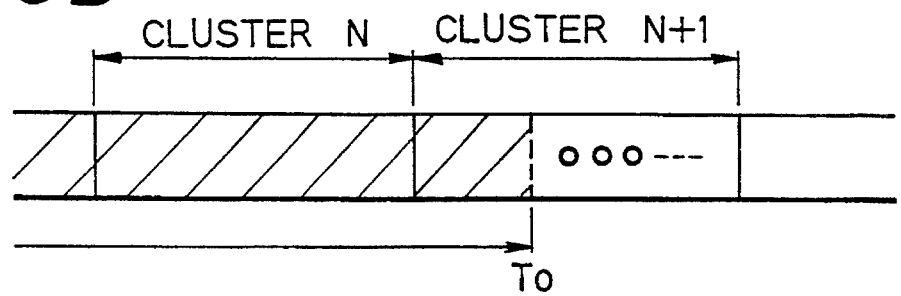

In other words, assume the following situation. As shown in FIG. 5A, before record data of the last cluster (N+1) is collected ($T_0$), the stop key 6 is pressed. At this point, as shown in FIG. 5B, dummy data is added to the data of cluster (N+1) stored in the memory 25. Thus, data of one cluster is formed. This data of one cluster is recorded on the optical disc 11B.

Figure 6:
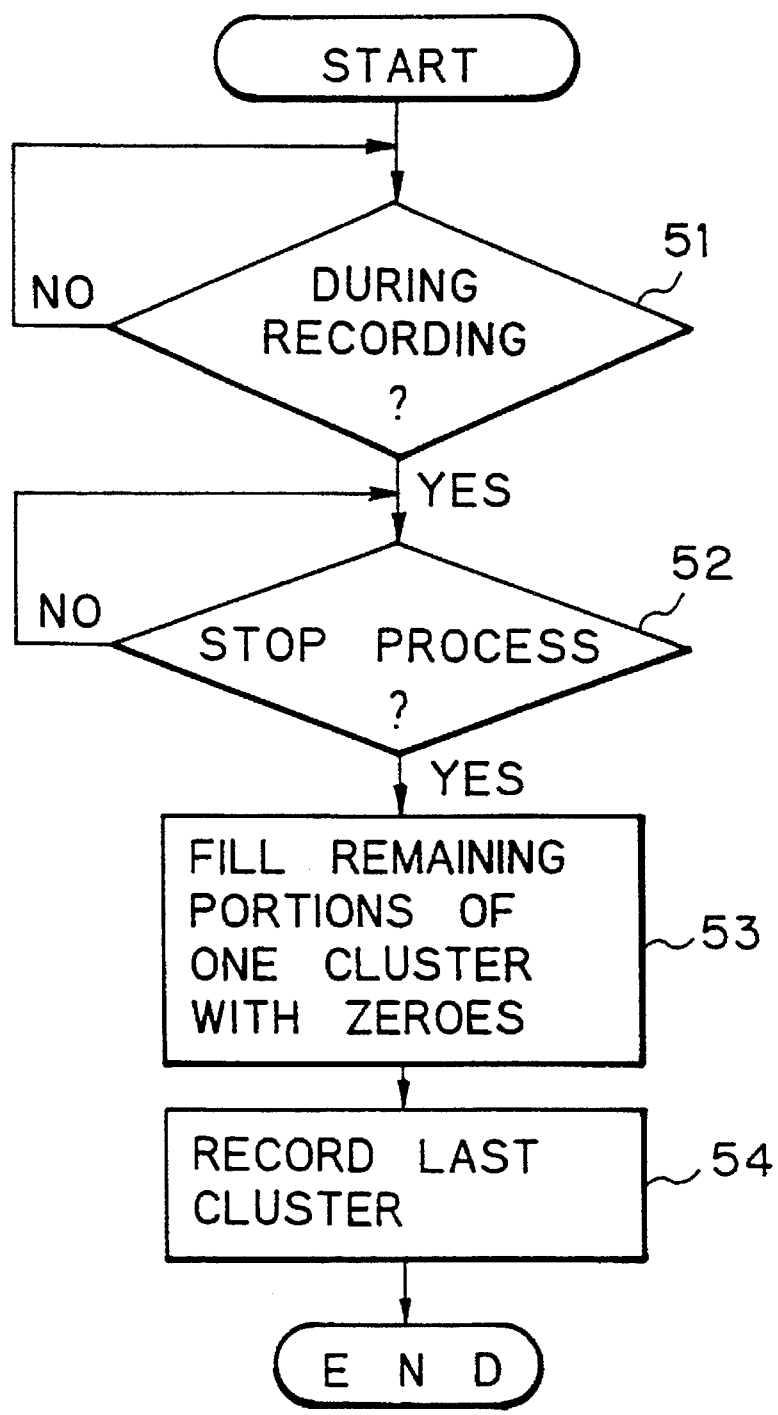
FIG. 6 is a flow chart for explaining the embodiment according to the present invention.
Figure 7:
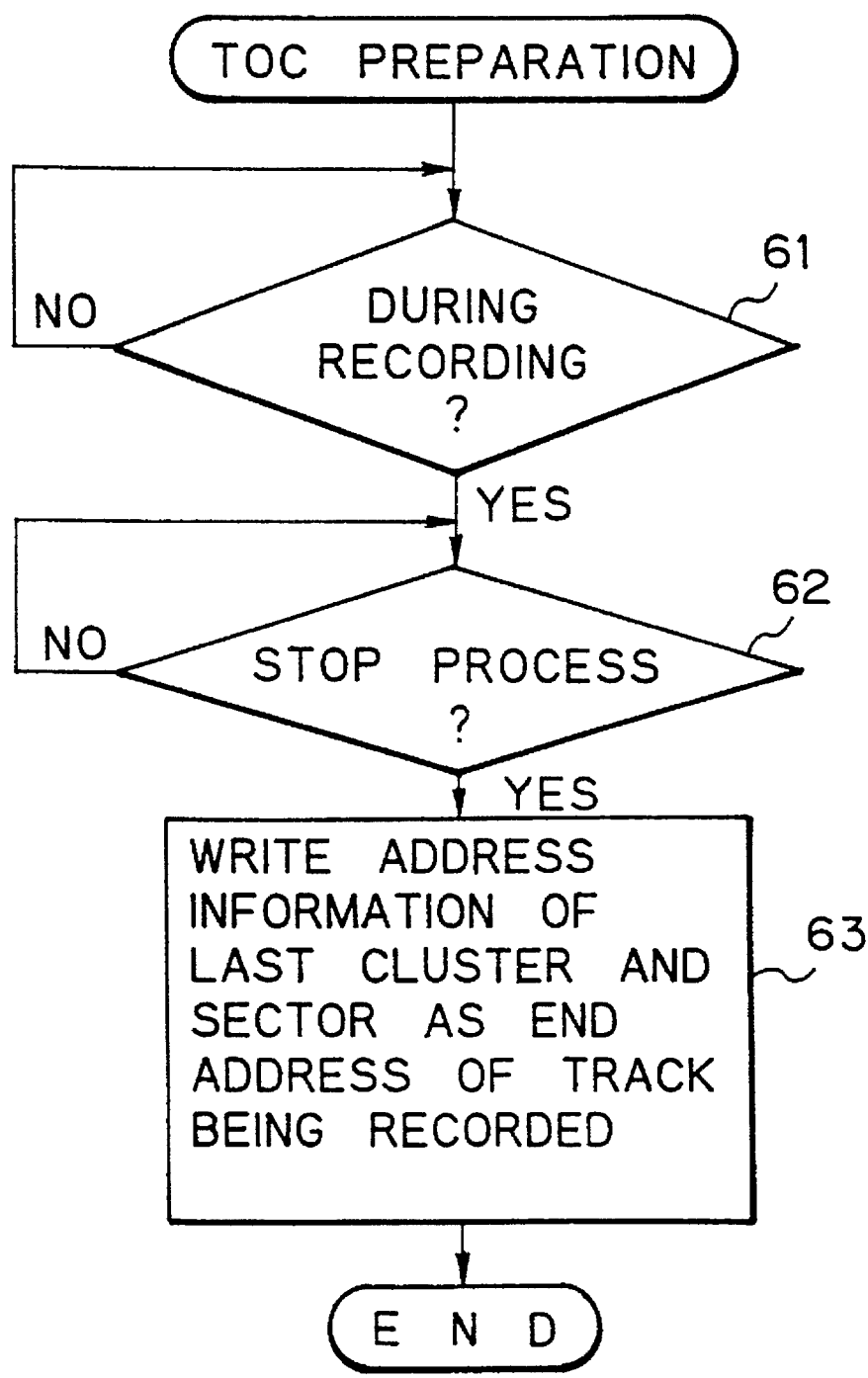
FIG. 7 is a flow chart for explaining the embodiment according to the present invention.

FIGS. 6 and 7 are flow charts showing this process. As shown in FIG. 6, it is determined whether or not data is being recorded (at step 51). When data is being recorded, it is determined whether or not the stop key 6 has been pressed and the stop process has been executed (at step 52). When the stop process has been executed, dummy data of all "0" is added to the data stored in the memory 25. Thus, data of one cluster is formed (at step 53). The data of the last cluster is recorded on the optical disc 11B (at step 54).

The presence of data in the memory 25 in the record stop state can be detected by checking whether or not the difference between the data write pointer to the memory 25 and the data read pointer from the memory 25 is zero. This detection is performed by the memory controller 24 or the system controller 17.

When data which was being stored in the memory 25 has been recorded on the optical disc 11B, the user TOC is recorded. Address information on the optical disc 11B according to the last cluster/sector of data stored in the memory 25 in the record stop state is sent to a user TOC generation memory area of the memory 25 as the end address of the program or the music program or as the last address of this record operation. In other words, as described above, the last cluster/sector of one cluster where data stored in the memory 25 is added to dummy data is not treated as the last address. Rather, the last cluster/sector of data stored in the memory 25 in the record stop state is treated as the last address. Thus, when the disc 11B is reproduced, only portions where data have been recorded are reproduced. Portions where dummy data have been stored are not reproduced. As a result, any data not limited to null data can be used as dummy data.

As shown in FIG. 7, the TOC is recorded on the optical disc 11B. In other words, it is determined whether or not data is being recorded (at step 61). While data is being recorded, it is determined whether the stop key 6 has been pressed and the stop process has been executed (at step 62). When the stop process has been executed, the address information on the optical disc 11B corresponding to the last cluster or the last sector of the data stored in the memory 25 when the stop key 6 is operated is written to the TOC area of the optical disc 11B as the last address of the program or the music program.

Figure 8A:
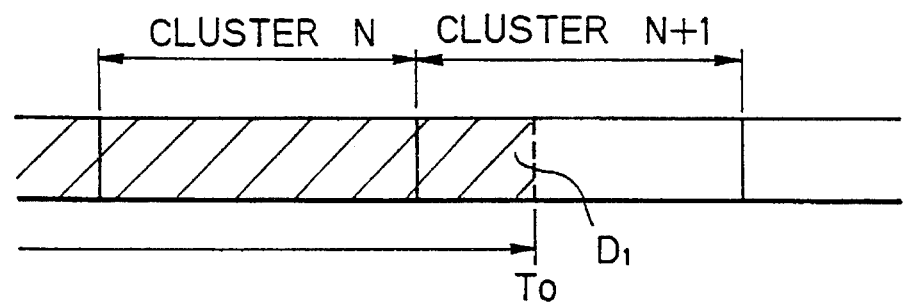
FIGS. 8A and 8B are schematic diagrams for explaining the embodiment according to the present invention.
Figure 8B:
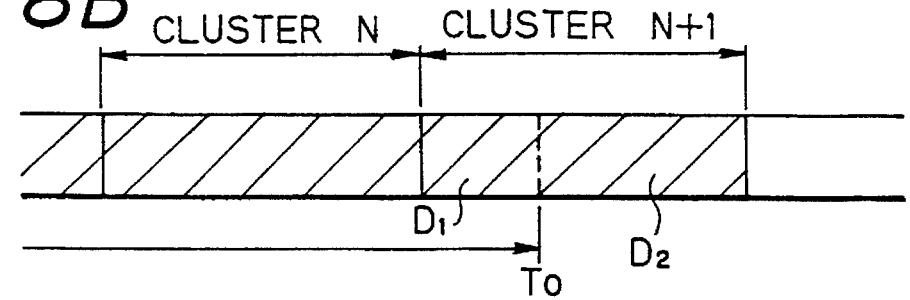

In addition, as shown in FIG. 8A, before data of last cluster (N+1) of a sequence of record data is collected ($T_0$), when the stop key 6 is pressed, data $D_1$ of the cluster (N+1) is stored until next data to be recorded is input. When data is input, as shown in FIG. 8B, the data $D_2$ and the data $D_1$ can be added to form and store the cluster (N+1).

In the embodiment according to the present invention, dummy data was generated by the data generation circuit provided in the memory controller 24. However, the data generation circuit may be provided in the system controller 17.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A disc recording apparatus comprising:
   a first encoder for compressing an input signal to form compressed data;
   a memory for temporarily storing said compressed data;
   a second encoder for performing a predetermined signal process to the compressed data read from said memory for a predetermined amount to create record data;

a head apparatus for recording said record data onto a disc; and a controller for controlling said memory and said head apparatus to read said compressed data from said memory, to record said record data on said disc, and to stop a record operation of said head apparatus in response to a portion of the compressed data in said memory, the portion of the compressed data having been previously stored, in a record stop state, in said memory.

2. A disc recording apparatus according to claim 1, wherein said controller comprises data generation means, data generated by said data generation means being added to said compressed data stored, in said record stop state, in said memory and the total of data generated by said data generation means and said compressed data stored in said memory being said predetermined amount.

3. A disc recording apparatus according to claim 1, wherein said controller is adapted to control said head apparatus to record data on said disc such that the last address of compressed data stored, in said record stop state, in said memory is recorded as a last record address information of the current record operation.

4. An audio disc recording apparatus comprising:

a converter for converting an input analog audio signal into a digital signal;

a memory for temporarily storing said digital signal received from said converter as digital data;

an encoder for performing a predetermined signal process for said digital data read from said memory for a predetermined record amount to create record data;

a head apparatus for recording record data processed by said encoder on a disc; and a controller for controlling said memory and said head apparatus to read said digital data from said memory, to record said record data on said disc, and to stop record operation of said head apparatus in response to a portion of said digital data in said memory, the portion of said digital data having been previously stored, in a record stop state, in said memory.

5. A disc recording apparatus for using a disc having a first recording area in which information data is recorded and a second recording area in which data related to the data recorded in said first recording area is recorded, said apparatus comprising:

a converter for converting an input analog signal into a digital signal;

a first encoder for compressing said digital signal converted by said converter into a compressed digital signal;

a memory for temporarily storing said compressed digital signal from said first encoder as digital data;

a second encoder for encoding said digital data, being read from said memory on a cluster by cluster basis, to create record data;

a head apparatus for recording, in said first recording area of said disc, said record data created by said second encoder; and a controller for controlling said memory and said head apparatus to read said digital data from said memory, to record said record data on said disc, and to stop record operation of said head apparatus in response to a portion of said digital data in said memory, said portion of said digital data having been previously stored, in a record stop state, in said memory.

6. A disc recording apparatus according to claim 5, wherein said controller further comprises a memory controller, said memory controller being adapted to control said memory to read, on a cluster by cluster basis, said digital data stored in said memory.

7. A disc recording apparatus according to claim 5, wherein said controller comprises data generation means, data generated by said data generation means being added to said digital data stored, in said record stop state, in said memory and the total of said generated data by said data generation means and said digital data stored in said memory being said predetermined amount.

8. A disc recording apparatus according to claim 5, wherein said controller is adapted to control said head apparatus to record said record data in said second recording area of said disc in such a way that the last cluster of digital data read from said memory, stored in said record stop state, is recorded as a last record address information of the current record operation.

9. A disc recording apparatus for using a disc having a first recording area in which information data is recorded and a second recording area in which data related to the data recorded in said first recording area is recorded, said apparatus comprising:

a converter for converting an input analog signal into a digital signal;

a first encoder for compressing said digital signal converted by said converter into a compressed digital signal;

a memory for temporarily storing said compressed digital signal from said first encoder as digital data;

a second encoder for encoding said digital data being read from said memory on-cluster by cluster basis creating recording data, said cluster being composed of a plurality of sectors;

a head apparatus for recording said record data encoded by said second encoder in said first recording area of said disc; and a controller for controlling said head apparatus and recording the last record address in said second recording area of said disc in such a way that said last address of cluster/sector of said digital data stored in said memory, in said record stop state, is recorded as a last record address, wherein said controller is adapted to control said memory and said head apparatus to read said digital data from said memory, record said record data on said disc, and stop record operation of said head apparatus, said stop record operation being in response to a portion of said digital data in said memory, said portion of said digital data having been previously stored, in a record stop state, in said memory.

10. A disc recording apparatus according to claim 9, wherein said controller comprises data generation means, data generated by said data generation means being added to said digital data stored, in said record stop state, in said memory and the total of said data generated by said data generation means and said digital data stored in said memory being one cluster.

11. A disc recording apparatus according to claim 9, wherein said controller further comprises a memory controller, said memory controller being adapted to control said memory to read said digital data, stored in said memory, on a cluster by cluster basis.

* * * * *